(12) United States Patent
Kato et al.

(10) Patent No.: US 10,101,440 B2
(45) Date of Patent: Oct. 16, 2018

(54) SENSOR DEVICE

(71) Applicant: Mitsubishi Electric Corporation, Tokyo (JP)

(72) Inventors: Yasunori Kato, Tokyo (JP); Shigeru Chikaoka, Tokyo (JP); Toru Takahashi, Tokyo (JP); Ryuhei Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/545,954

(22) PCT Filed: Jun. 8, 2015

(86) PCT No.: PCT/JP2015/066514
§ 371 (c)(1),
(2) Date: Jul. 24, 2017

(87) PCT Pub. No.: WO2016/199202
PCT Pub. Date: Dec. 15, 2016

(65) Prior Publication Data
US 2018/0017666 A1 Jan. 18, 2018

(51) Int. Cl.
*H01Q 3/26* (2006.01)
*G01S 13/00* (2006.01)
(Continued)

(52) U.S. Cl.
CPC ............. *G01S 7/4052* (2013.01); *H01Q 3/26* (2013.01); *G01S 2007/406* (2013.01)

(58) Field of Classification Search
CPC ............ G01S 7/4052; G01S 2007/406; G01S 13/882; G01S 3/48; H01Q 3/26;
(Continued)

(56) References Cited

U.S. PATENT DOCUMENTS 6,985,107 B2 * 1/2006 Anson ................. G01S 3/48
342/451
8,213,541 B2 * 7/2012 Nakao ................ H04L 27/2657
375/316
(Continued)

FOREIGN PATENT DOCUMENTS

EP 1422838 A2 * 5/2004 ........... H04B 7/0854
JP H01-129509 A 5/1989
(Continued)

OTHER PUBLICATIONS

The extended European search report issued by the European Patent Office dated Mar. 28, 2018, which corresponds to European Patent Application No. 15894888.5-1206 and is related to U.S. Appl. No. 15/545,954.
(Continued)

*Primary Examiner* — Timothy A Brainard
*Assistant Examiner* — Nuzhat Pervin
(74) *Attorney, Agent, or Firm* — Studebaker & Brackett PC

(57) ABSTRACT

There are provided correlation process units 5-1 (5-2, . . . , and 5-N) for performing a cross-correlation process between replicas of a plurality of mutually orthogonal transmission signals and reception signals of receiving antenna elements 3-1 (3-2, . . . , and 3-N) and outputting a plurality of signals after the cross-correlation process, and a weighting unit 6 for weighting the plurality of signals after the cross-correlation process outputted from the correlation process units 5-1 to 5-N in accordance with the arrangement of transmitting antennas 2-1 to 2-3 and the receiving antenna elements 3-1 to 3-N and an antenna directivity pattern, and a signal combination unit 10 combines the plurality of signals after the cross-correlation process that are weighted by the weighting unit 6.

5 Claims, 7 Drawing Sheets

(51) Int. Cl.
 *H04B 3/10* (2006.01)
 *G01S 7/40* (2006.01)
(58) Field of Classification Search
 CPC .... H01Q 21/06; H01Q 21/061; H04B 7/0691;
 H04B 7/02; H04B 7/0854; H04B 1/707;
 H04B 7/0617; H04B 7/0604; H04L
 27/2657
 USPC ........................................................ 342/169
 See application file for complete search history.

(56) References Cited

U.S. PATENT DOCUMENTS

| | | | | |
|---|---|---|---|---|
| 8,289,203 | B2* | 10/2012 | Culkin | H01Q 21/061 342/117 |
| 2004/0106386 | A1* | 6/2004 | Doi | H04B 7/0854 455/165.1 |
| 2005/0163264 | A1* | 7/2005 | Nakao | H04B 7/0691 375/343 |
| 2005/0164655 | A1* | 7/2005 | Nakao | H04B 7/02 455/101 |
| 2005/0169403 | A1* | 8/2005 | Doi | H04B 7/0854 375/316 |
| 2005/0175121 | A1* | 8/2005 | Doi | H04B 7/0854 375/316 |
| 2005/0180535 | A1* | 8/2005 | Doi | H04B 7/0854 375/350 |
| 2006/0094468 | A1* | 5/2006 | Hoshino | H04B 7/0604 455/561 |
| 2006/0256899 | A1* | 11/2006 | Doi | H04B 7/0854 375/347 |
| 2006/0256900 | A1* | 11/2006 | Doi | H04B 7/0854 375/347 |
| 2006/0256901 | A1* | 11/2006 | Doi | H04B 7/0854 375/347 |
| 2006/0256902 | A1* | 11/2006 | Doi | H04B 7/0854 375/349 |
| 2006/0256903 | A1* | 11/2006 | Doi | H04B 7/0854 375/349 |
| 2006/0256904 | A1* | 11/2006 | Doi | H04B 7/0854 375/349 |
| 2006/0256905 | A1* | 11/2006 | Doi | H04B 7/0854 375/349 |
| 2007/0147545 | A1* | 6/2007 | Doi | H04B 7/0854 375/316 |
| 2007/0211786 | A1* | 9/2007 | Shattil | H04B 1/707 375/141 |
| 2008/0063012 | A1* | 3/2008 | Nakao | H04L 27/2657 370/500 |
| 2008/0100499 | A1* | 5/2008 | Nishimura | G01S 7/03 342/75 |
| 2009/0279523 | A1* | 11/2009 | Doi | H04B 7/0617 370/338 |
| 2011/0279669 | A1* | 11/2011 | Longstaff | G01S 13/882 348/135 |
| 2011/0298676 | A1* | 12/2011 | Yanagihara | H01Q 21/06 343/711 |
| 2016/0093950 | A1* | 3/2016 | Cummings | G01S 3/74 342/359 |

FOREIGN PATENT DOCUMENTS

| | | | | |
|---|---|---|---|---|
| JP | 2001036451 A | * | 2/2001 | ............ H04B 7/086 |
| JP | 2005244912 A | * | 9/2005 | ........... H04B 7/0691 |
| JP | 2006060765 A | * | 3/2006 | .............. H04B 7/02 |
| JP | 2006197647 A | * | 7/2006 | .............. H04B 7/04 |
| JP | 2011010353 A | * | 1/2011 | .............. H04B 7/08 |
| JP | 2013-509066 A | | 3/2013 | |
| JP | 2014-153142 A | | 8/2014 | |
| JP | 2014153142 A | * | 8/2014 | |
| WO | 2010/085846 A2 | | 8/2010 | |

OTHER PUBLICATIONS

Berry P E et al; Optimal fast-time beamforming with linearly independent waveforms; Signal Processing; Elsevier; Apr. 1, 2009; pp. 492-501; vol. 89; XP025839407; Amsterdam, NL.
International Search Report issued in PCT/JP2015/066514; dated Aug. 25, 2015.
Chun-Yang Chen et al.; "MIMO Radar Space-Time Adaptive Processing Using Prolate Spheroidal Wave Functions"; IEEE Transactions on Signal Processing; Feb. 2008; pp. 623-635; vol. 56, No. 2.
Written Opinion issued in PCT/JP2015/066514; dated Aug. 25, 2015.

* cited by examiner

SENSOR DEVICE

TECHNICAL FIELD

The invention relates to a sensor device used when a radar device for observing a position or speed of an observation target and the tike, for example, such as a moving object and a stationary object transmits and receives a radar signal.

BACKGROUND ART

As for the directivity pattern of an antenna in a sensor device, a method for weighting reception signals of a plurality of antenna elements constituting an array antenna or a method for placing the plurality of antenna elements has been widely discussed hitherto in order to obtain a desired directivity pattern.

For example, Patent Literature 1 shown below discloses a method for reducing a side lobe by dividing an array antenna into sub-arrays and performing weighting on each sub-array.

In addition, Patent Literature 2 shown below discloses a method for reducing a side lobe by determining intervals between a plurality of antenna elements constituting an array antenna in accordance with the Fibonacci sequence.

CITATION LIST

Patent Literature

Patent Literature 1: Japanese Patent Application Laid-open No. H1-129509
Patent Literature 2: Japanese Translation of PCT Application No. 2013-509066

SUMMARY OF INVENTION

Technical Problem

The conventional sensor device is configured as described above, and hence it is possible to reduce the side lobe, but the conventional sensor device has a problem in that it is not possible to virtually increase the aperture length of the array antenna constituted by one or more receiving antenna elements in order to increase the directivity of the antenna.

The invention has been made in order to solve the above problem, and an object thereof is to obtain a sensor device capable of virtually increasing the aperture length of an array antenna constituted by a plurality of receiving antenna elements.

Solution to Problem

A sensor device according to the invention is provided with a transmission signal generator to generate a plurality of mutually orthogonal transmission signals, a transmitting antenna unit to emit the transmission signals generated by the transmission signal generator from a plurality of transmitting antennas to space, an array antenna constituted by one or more receiving antenna elements to receive reflected waves of the transmission signals that are reflected by an observation target after being emitted from the plurality of transmitting antennas, a plurality of correlation processors to perform a cross-correlation process between the plurality of transmission signals and reception signals of the receiving antenna elements and outputting a plurality of signals after the cross-correlation process, and a weighting unit to weight the plurality of signals after the cross-correlation process outputted from the plurality of correlation processors in accordance with a placement of the transmitting antennas and the receiving antenna elements and an antenna directivity pattern, and a signal combiner combines the plurality of signals after the cross-correlation process that are weighted by the weighting unit.

Advantageous Effects of Invention

According to the invention, provided are the plurality of correlation process units for performing the cross-correlation process between the plurality of mutually orthogonal transmission signals and the reception signals of the receiving antenna elements and outputting the plurality of signals after the cross-correlation process, and the weighting unit for weighting the plurality of signals after the cross-correlation process outputted from the plurality of correlation process units in accordance with the arrangement of the transmitting antennas and the receiving antenna elements and the antenna directivity pattern, and the signal combination unit combines the plurality of signals after the cross-correlation process that are weighted by the weighting unit, and hence the effect is achieved that it is possible to virtually increase the aperture length of the array antenna constituted by the one or more receiving antenna elements.

DESCRIPTION OF EMBODIMENTS

Hereinbelow, in order to describe the invention in greater detail, embodiments will be described with reference to accompanying drawings.

Embodiment 1

Figure 1:
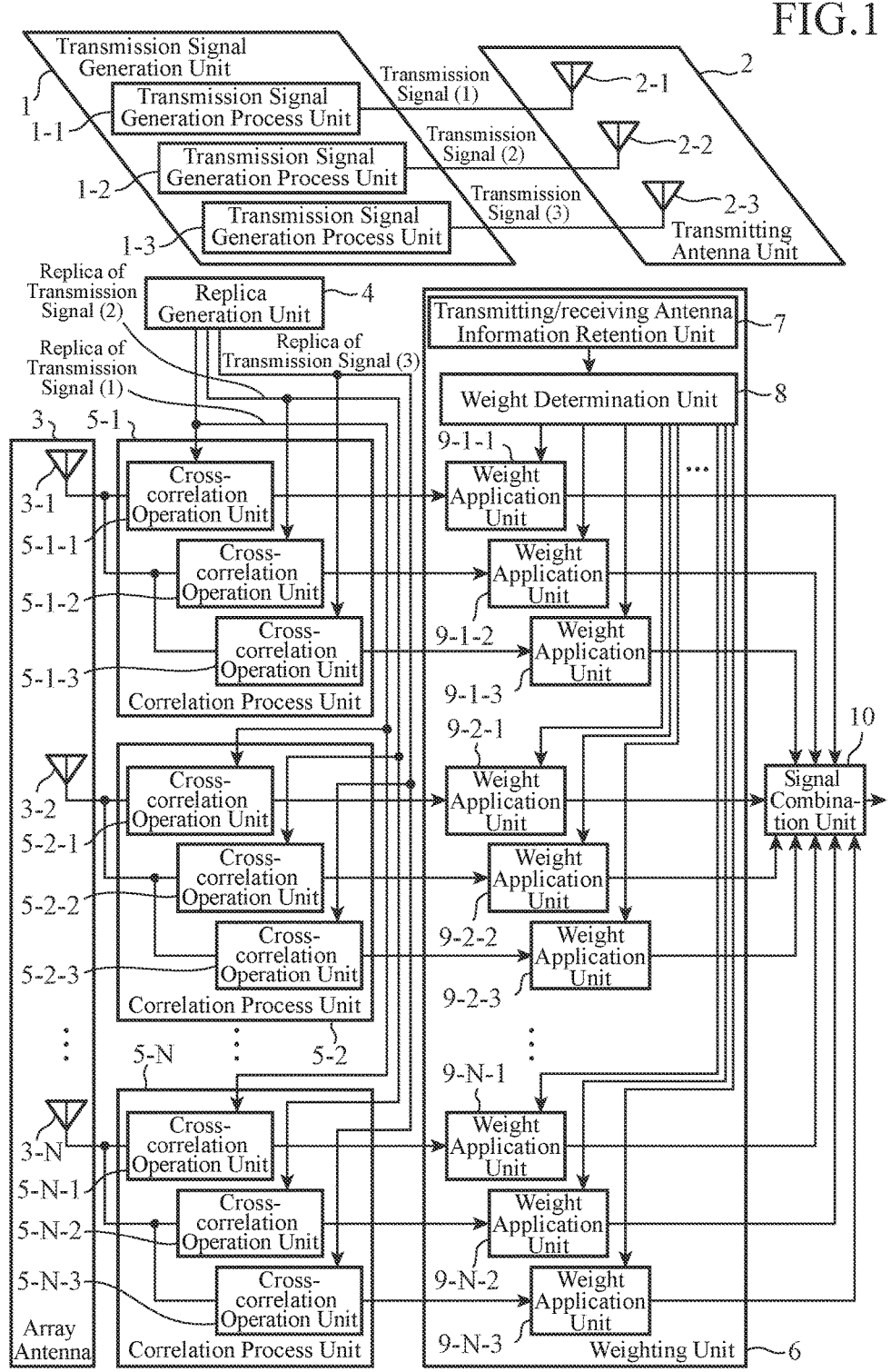
FIG. 1 is a configuration diagram showing a sensor device according to Embodiment 1 of the invention.

FIG. 1 is a configuration diagram showing a sensor device according to Embodiment 1 of the invention.

In FIG. 1, a transmission signal generation unit 1 generates a plurality of mutually orthogonal transmission signals, and outputs the plurality of transmission signals to a transmitting antenna unit 2.

In an example in FIG. 1, the transmission signal generation unit 1 includes three transmission signal generation process units 1-1 to 1-3, and generates three mutually orthogonal transmission signals, but this is only exemplary, and the transmission signal generation unit 1 only needs to generate two or more mutually orthogonal transmission signals.

The transmission signal generation process units 1-1 to 1-3 generate mutually orthogonal transmission signals (1) to (3) by using any one or plural mutually different times, mutually different frequencies, and mutually different codes.

For example, as a method for generating the mutually orthogonal transmission signals (1) to (3) by using mutually different codes, it is conceivable to generate the mutually orthogonal transmission signals (1) to (3) by modulating the transmission signal using a plurality of code sequences, which are orthogonal to each other, such as Barker codes, M sequences, or cold sequences.

As a method for generating the mutually orthogonal transmission signals (1) to (3) by using mutually different frequencies, it is conceivable to generate the mutually orthogonal transmission signals (1) to (3) by modulating the transmission signal with subcarriers that are mutually orthogonal carrier waves.

As a method for generating the mutually orthogonal transmission signals (1) to (3) by using mutually different times, it is conceivable to vary the transmission time of the transmission signals (1) to (3) by varying the generation time of the transmission signals (1) to (3).

The transmitting antenna unit 2 is constituted by transmitting antennas 2-1 to 2-3, and emits the three transmission signals (1) to (3) outputted from the transmission signal generation unit 1 to space.

That is, the transmitting antenna 2-1 emits the transmission signal (1) generated by the transmission signal generation process unit 1-1 to space.

The transmitting antenna 2-2 emits the transmission signal (2) generated by the transmission signal generation process unit 1-2 to space.

The transmitting antenna 2-3 emits the transmission signal (3) generated by the transmission signal generation process unit 1-3 to space.

An array antenna 3 is constituted by receiving antenna elements 3-1 to 3-N.

The receiving antenna elements 3-1 to 3-N receive reflected waves of the transmission signals (1) to (3) that are reflected by an observation target such as a moving object and a stationary object and that are returned after being emitted from the transmitting antennas 2-1 to 2-3.

FIG. 1 shows an example in which the array antenna 3 is constituted by N sets of receiving antenna elements 3-1 to 3-N, but the array antenna 3 only needs to include one or more receiving antenna elements.

A replica generation unit 4 generates replicas of the transmission signals (1) to (3) generated by the transmission signal generation process units 1-1 to 1-3, and outputs the replicas or the transmission signals (1) to (3) to correlation process units 5-1 to 5-N.

FIG. 1 shows an example in which the replica generation unit 4 outputs the replicas of the transmission signals (1) to (3) to the correlation process units 5-1 to 5-N, but the transmission signal generation process units 1-1 to 1-3 may output the transmission signals (1) to (3) to the correlation process units 5-1 to 5-N. In this case, it is possible to omit the replica generation unit 4. However, by mounting the replica generation unit 4, it is possible to give the same signals as the transmission signals (1) to (3) emitted from the transmitting antennas 2-1 to 2-3 to the correlation process units 5-1 to 5-N even in the case where the installation positions of the transmission signal generation unit 1 and the correlation process units 5-1 to 5-N are far away from each other.

The correlation process unit 5-1 is constituted by cross-correlation operation units 5-1-1 to 4-1-3.

The cross-correlation operation unit 5-1-1 extracts a signal having the same waveform as that of the transmission signal (1) (a signal correlated with the transmission signal (1)) from among the reception signals of the receiving antenna element 3-1 by performing a cross-correlation process between the replica of the transmission signal (1) generated by the replica generation unit 4 and the reception signal of the receiving antenna element 3-1, and outputs the signal as a signal after the cross-correlation process.

The cross-correlation operation unit 5-1-2 extracts a signal having the same waveform as that of the transmission signal (2) (a signal correlated with the transmission signal (2)) from among the reception signals of the receiving antenna element 3-1 by performing the cross-correlation process between the replica of the transmission signal (2) generated by the replica generation unit 4 and the reception signal of the receiving antenna element 3-1, and outputs the signal as the signal after the cross-correlation process.

The cross-correlation operation unit 5-1-3 extracts a signal having the same waveform as that of the transmission signal (3) (a signal correlated with the transmission signal (3)) from among the reception signals of the receiving antenna element 3-1 by performing the cross-correlation process between the replica of the transmission signal (3) generated by the replica generation unit 4 and the reception signal of the receiving antenna element 3-1, and outputs the signal as the signal after the cross-correlation process.

The correlation process unit 5-2 is constituted by cross-correlation operation units 5-2-1 to 5-2-3.

The cross-correlation operation unit 5-2-1 extracts a signal having the same waveform as that of the transmission signal (1) from among the reception signals of the receiving antenna element 3-2 by performing the cross-correlation process between the replica of the transmission signal (1) generated by the replica generation unit 4 and the reception signal of the receiving antenna element 3-2, and outputs the signal as the signal after the cross-correlation process.

The cross-correlation operation unit 5-2-2 extracts a signal having the same waveform as that of the transmission signal (2) from among the reception signals of the receiving antenna element 3-2 by performing the cross-correlation process between the replica of the transmission signal (2) generated by the replica generation unit 4 and the reception signal of the receiving antenna element 3-2, and outputs the signal as the signal after the cross-correlation process.

The cross-correlation operation unit 5-2-3 extracts a signal having the same waveform as that of the transmission signal (3) from among the reception signals of the receiving antenna element 3-2 by performing the cross-correlation process between the replica of the transmission signal (3) generated by the replica generation unit 4 and the reception signal of the receiving antenna element 3-2, and outputs the signal as the signal after the cross-correlation process.

The correlation process unit 5-N is constituted by cross-correlation operation units 5-N-1 to 5-N-3.

The cross-correlation operation unit 5-N-1 extracts a signal having the same waveform as that of the transmission signal (1) from among the reception signals of the receiving antenna element 3-N by performing the cross-correlation process between the replica of the transmission signal (1) generated by the replica generation unit 4 and the reception signal of the receiving antenna element 3-N, and outputs the signal as the signal after the cross-correlation process.

The cross-correlation operation unit 5-N-2 extracts a signal having the same waveform as that of the transmission signal (2) from among the reception signals of the receiving antenna element 3-N by performing the cross-correlation process between the replica of the transmission signal (2) generated by the replica generation unit 4 and the reception signal of the receiving antenna element 3-N, and outputs the signal as the signal after the cross-correlation process.

The cross-correlation operation unit 5-N-3 extracts a signal having the same waveform as that of the transmission signal (3) from among the reception signals of the receiving antenna element 3-N by performing the cross-correlation process between the replica of the transmission signal (3) generated by the replica generation unit 4 and the reception signal of the receiving antenna element 3-N, and outputs the signal as the signal after the cross-correlation process.

A weighting unit 6 is constituted a transmitting/receiving antenna information retention unit 7, a weight determination unit 8, and weight application units 9-1-1 to 9-1-3, 9-2-1 to 9-2-3, . . . , and 9-N-1 to 9-N-3, and the weighting unit 6 weights the signals after the cross-correlation process outputted from the cross-correlation operation units 5-1-1 to 5-1-3, 5-2-1 to 5-2-3, . . . , and 5-N-1 to 5-N-3 in accordance with the arrangement of the transmitting antennas 2-1 to 2-3 and the receiving antenna elements 3-1 to 3-N and a preset antenna directivity pattern.

The transmitting/receiving antenna information retention unit 7 is constituted by a storage device, e.g., such as a RAM or a hard disk, and retains information indicative of the arrangement of the transmitting antennas 2-1 to 2-3 and the receiving antenna elements 3-1 to 3-N, and a preset desired antenna directivity pattern.

Note that the antenna directivity pattern retained in the transmitting/receiving antenna information retention unit 7 indicates, for example, the beam width of an antenna aperture after the cross-correlation process and a side lobe level.

The weight determination unit 8 refers to the information indicative of the arrangement of the transmitting antennas 2-1 to 2-3 and the receiving antenna elements 3-1 to 3-N retained in the transmitting/receiving antenna information retention unit 7, obtains the antenna aperture after the cross-correlation process by the correlation process units 5-1 to 5-N, i.e., the length of the virtually enlarged antenna aperture of the receiving antenna elements 3-1 to 3-N, and executes a process of determining a weight (weight value) by which the signals after the cross-correlation process outputted from the cross-correlation operation units 5-1-1 to 5-1-3, 5-2-1 to 5-2-3, . . . , and 5-N-1 to 5-N-3 are multiplied in accordance with the length of the antenna aperture and the antenna directivity pattern retained in the transmitting/receiving antenna information retention unit 7.

The weight application units 9-1-1 to 9-1-3, 9-2-1 to 9-2-3, . . . , and 9-N-1 to 9-N-3 execute a process of multiplying the signals after the cross-correlation process outputted from the cross-correlation operation units 5-1-1 to 5-1-3, 5-2-1 to 5-2-3, . . . , and 5-N-1 to 5-N-3 by the weight determined by the weight determination unit 8, and outputting the signals after the cross-correlation process that are multiplied by the weight to a signal combination unit 10.

The signal combination unit 10 performs a process of combining the signals after cross-correlation process multiplied by the weight that are outputted from the weight application units 9-1-1 to 9-1-3, 9-2-1 to 9-2-3, . . . , and 9-N-1 to 9-N-3 and outputting the combined signal.

In FIG. 1, it is assumed that each of the transmission signal generation unit 1, the transmitting antenna unit 2, the array antenna 3, the replica generation unit 4, the correlation process units 5-1 to 5-N, the weighting unit 6, and the signal combination unit 10 serving as components of the sensor device is configured by dedicated hardware. The components other than the transmitting antenna unit 2 and the array antenna 3 are assumed to be configured by, e.g., a semiconductor integrated circuit that includes a CPU or a one-chip microcomputer.

However, the components other than the transmitting antenna unit 2 and the array antenna 3 may also be configured by a computer.

Figure 2:
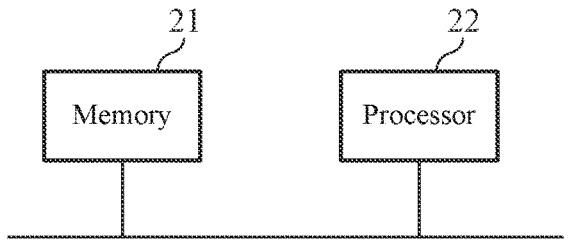
FIG. 2 is a hardware configuration diagram in the case where part of the sensor device is configured by a computer.

FIG. 2 as a hardware configuration diagram in the case where part of the sensor device is configured by the computer.

In the case where the components other than the transmitting antenna unit 2 and the array antenna 3 are configured by the computer, the transmitting/receiving antenna information retention unit 7 may be configured on a memory 21 of the computer, a program in which the content of the processes of the transmission signal generation unit 1, the replica generation unit 4, the correlation process units 5-1 to 5-N, the weight determination unit 8, the weight application units 9-1-1 to 9-1-3, 9-2-1 to 9-2-3, . . . , and 9-N-1 to 9-N-3, and the signal combination unit 10 is described may be stored in the memory 21, and a processor 22 of the computer may execute the program stored in the memory 21.

Figure 3:
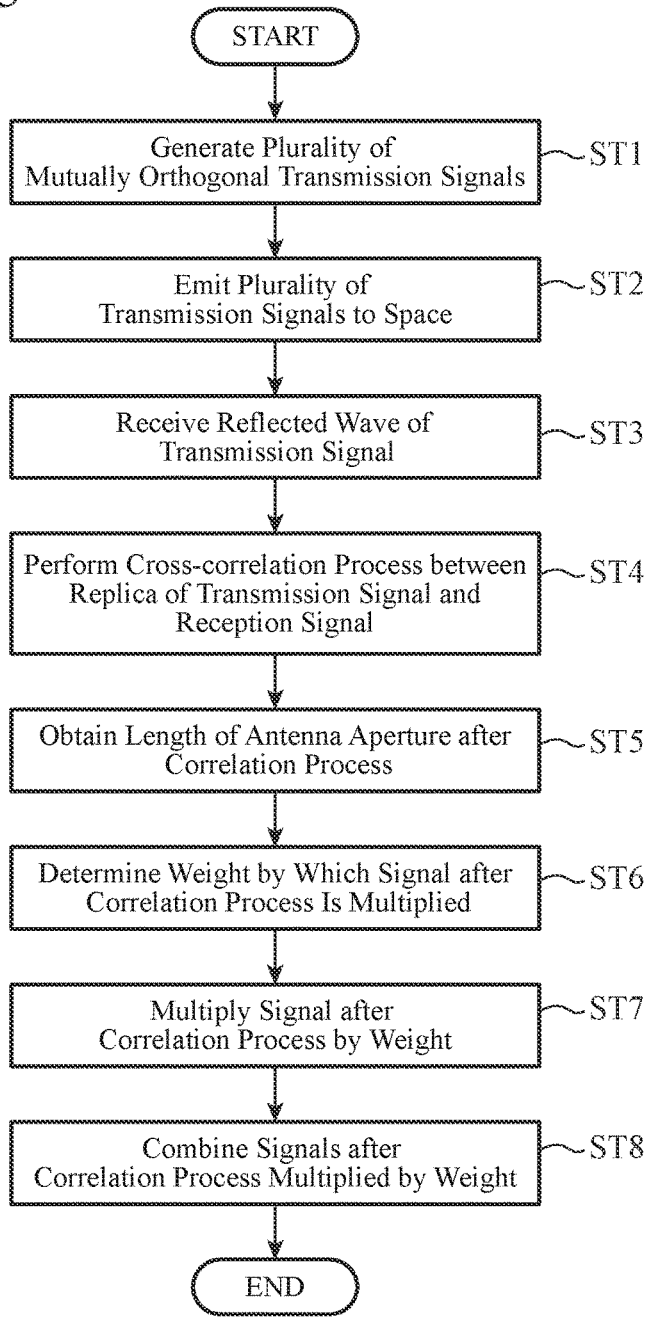
FIG. 3 is a flowchart showing details of processes of the sensor device according to Embodiment 1 of the invention.

FIG. 3 is a flowchart showing the content of the processes of the sensor device according to Embodiment 1 of the invention.

In FIG. 1, for simplification of the description, components that general radio communication devices include, e.g., such as an amplifier, a frequency converter, a filter, an analog/digital converter, and a digital/analog converter are omitted, but these components are actually provided.

Next, operations will be described.

The information indicative of the arrangement of the transmitting antennas 2-1 to 2-3 and the receiving antenna elements 3-1 to 3-N is pre-stored in the transmitting/receiving antenna information retention unit 7 and, in Embodiment 1, for convenience of the description, it is assumed that the interval between the transmitting antenna 2-1 and the transmitting antenna 2-2 is $D_{TX1}$, and the interval between the transmitting antenna 2-2 and the transmitting antenna 2-3 is $d_{TX2}$.

In addition, it is assumed that the interval between the receiving antenna element 3-1 and the receiving antenna element 3-2 is $d_{RX1}$, and the interval between the receiving antenna element 3-2 and the receiving antenna element 3-3 is $d_{RX2}$. Further, it is assumed that the interval between the receiving antenna element 3-(N−1) and the receiving antenna element 3-N is $d_{RX(N-1)}$.

The transmission signal generation process units 1-1 to 1-3 of the transmission signal generation unit 1 generate the mutually orthogonal transmission signals (1) to (3), and output the transmission signals (1) to (3) to the transmitting antenna unit 2 (Step ST1 in FIG. 3).

The generation method of the mutually orthogonal transmission signals (1) to (3) is not particularly limited, and it is possible to generate the mutually orthogonal transmission signals (1) to (3), for example, by modulating the same transmission signal using a plurality of code sequences, which are orthogonal to each other, such as Barker codes, M sequences, and cold sequences, with the transmission signal generation process units 1-1 to 1-3.

With this, the three mutually orthogonal transmission signals (1) to (3) are emitted to space from the transmitting antennas 2-1 to 2-3 of the transmitting antenna unit 2 (Step ST2).

Herein, a difference in the path from each of the transmitting antennas 2-1 to 2-3 to the observation target is represented by the following Expression (1).

$$\text{Transmitting antenna 2-1: } e^{-j\frac{2\pi}{\lambda}(0 \cdot \sin\theta)} \quad (1)$$

$$\text{Transmitting antenna 2-2: } e^{-j\frac{2\pi}{\lambda}(d_{TX1}\sin\theta)}$$

$$\text{Transmitting antenna 2-3: } e^{-j\frac{2\pi}{\lambda}((d_{TX1}+d_{TX2})\sin\theta)}$$

In Expression (1), θ is an angle of the observation target with respect to the boresight direction of the array antenna in the case where the transmitting antennas 2-1 to 2-3 are regarded as one array antenna. In addition, λ is the wavelength of each of the transmission signals (1) to (3).

After being emitted from the transmitting antennas 2-1 to 2-3, the receiving antenna elements 3-1 to 3-N of the array antenna 3 receive the reflected waves of the transmission signals (1) to (3) that are reflected by the observation target and are returned after the transmission signals (1) to (3) (Step ST3).

Herein, a difference in the path from the observation target to each of the receiving antenna elements 3-1 to 3-N is represented by the following Expression (2).

$$\text{Receiving antenna element 3-1: } e^{-j\frac{2\pi}{\lambda}(0 \cdot \sin\theta)} \quad (2)$$

$$\text{Receiving antenna element 3-2: } e^{-j\frac{2\pi}{\lambda}(d_{RX1}\sin\theta)}$$

$$\vdots$$

$$\text{Receiving antenna element 3-}N\text{: } e^{-j\frac{2\pi}{\lambda}\left(\left(\sum_{p=1}^{N-1}d_{RXp}\right)\sin\theta\right)}$$

In Expression (2), θ is the angle of the observation target with respect to the boresight direction of the array antenna 3.

Expressions (1) and (2) indicate an example in which the boresight direction of the array antenna in the case where the transmitting antennas 2-1 to 2-3 are regarded as one array antenna matches the boresight direction of the array antenna 3.

Consequently, a difference in the path from the transmitting antenna 2-1 to the observation target and then from the observation target to each of the receiving antenna elements 3-1 to 3-N is represented by the following Expression (3).

$$\text{Receiving antenna element 3-1:} \quad (3)$$

$$e^{-j\frac{2\pi}{\lambda}(0 \cdot \sin\theta)} e^{-j\frac{2\pi}{\lambda}(0 \cdot \sin\theta)} = e^{-j\frac{2\pi}{\lambda}(0 \cdot \sin\theta + 0 \cdot \sin\theta)}$$

$$\text{Receiving antenna element 3-2:}$$

$$e^{-j\frac{2\pi}{\lambda}(0 \cdot \sin\theta)} e^{-j\frac{2\pi}{\lambda}(d_{RX1}\sin\theta)} = e^{-j\frac{2\pi}{\lambda}(0+d_{RX1})\sin\theta}$$

$$\vdots$$

Receiving antenna element 3-$N$:

$$e^{-j\frac{2\pi}{\lambda}(0 \cdot \sin\theta)} e^{-j\frac{2\pi}{\lambda}\left(\left(\sum_{p=1}^{N-1}d_{RXp}\right)\sin\theta\right)} = e^{-j\frac{2\pi}{\lambda}\left(0+\left(\sum_{p=1}^{N-1}d_{RXp}\right)\right)\sin\theta}$$

In addition, a difference in the path from the transmitting antenna 2-2 to the observation target and then from the observation target to each of the receiving antenna elements 3-1 to 3-N is represented by the following Expression (4).

$$\text{Receiving antenna element 3-1:} \quad (4)$$

$$e^{-j\frac{2\pi}{\lambda}(d_{TX1}\sin\theta)} e^{-j\frac{2\pi}{\lambda}(0 \cdot \sin\theta)} = e^{-j\frac{2\pi}{\lambda}(d_{TX1}+0)\sin\theta}$$

$$\text{Receiving antenna element 3-2:}$$

$$e^{-j\frac{2\pi}{\lambda}(d_{TX1}\sin\theta)} e^{-j\frac{2\pi}{\lambda}(d_{RX1}\sin\theta)} = e^{-j\frac{2\pi}{\lambda}(d_{TX1}+d_{RX1})\sin\theta}$$

$$\vdots$$

Receiving antenna element 3-$N$:

$$e^{-j\frac{2\pi}{\lambda}(d_{TX1}\sin\theta)} e^{-j\frac{2\pi}{\lambda}\left(\left(\sum_{p=1}^{N-1}d_{RXx}\right)\sin\theta\right)} = e^{-j\frac{2\pi}{\lambda}\left(d_{TX1}+\left(\sum_{p=1}^{N-1}d_{RXp}\right)\right)\sin\theta}$$

Further, a difference in the path from the transmitting antenna 2-3 to the observation target and then from the observation target to each of the receiving antenna elements 3-1 to 3-N is represented by the following Expression (5).

$$\text{Receiving antenna element 3-1:} \quad (5)$$

$$e^{-j\frac{2\pi}{\lambda}((d_{TX1}+d_{TX2})\sin\theta)} e^{-j\frac{2\pi}{\lambda}(0 \cdot \sin\theta)} = e^{-j\frac{2\pi}{\lambda}((d_{TX1}+d_{TX2})+0)\sin\theta}$$

$$\text{Receiving antenna element 3-2:}$$

$$e^{-j\frac{2\pi}{\lambda}((d_{TX1}+d_{TX2})\sin\theta)} e^{-j\frac{2\pi}{\lambda}(d_{RX1}\sin\theta)} = e^{-j\frac{2\pi}{\lambda}((d_{TX1}+d_{TX2})+d_{RX1})\sin\theta}$$

$$\vdots$$

Receiving antenna element 3-$N$:

$$e^{-j\frac{2\pi}{\lambda}((d_{TX1}+d_{TX2})\sin\theta)} e^{-j\frac{2\pi}{\lambda}\left(\left(\sum_{p=1}^{N-1}d_{RXp}\right)\sin\theta\right)} =$$

$$e^{-j\frac{2\pi}{\lambda}\left((d_{TX1}+d_{TX2})+\left(\sum_{p=1}^{N-1}d_{RXp}\right)\right)\sin\theta}$$

In Expressions (3) to (5), (A) in $e^{-j(2\pi/\lambda)(A)\sin\theta}$ is a part related to the arrangement of the transmitting antennas 2-1 to 2-3 and the receiving antenna elements 3-1 to 3-N.

When the transmission signal generation process units 1-1 to 1-3 generate the transmission signals (1) to (3), the replica generation unit 4 generates the replicas of the transmission signals (1) to (3), and outputs the replicas of the transmission signals (1) to (3) to the correlation process units 5-1 to 5-N.

When the receiving antenna element 3-1 receives the reflected waves of the transmission signals (1) to (3) that are reflected by the observation target and returned, the cross-correlation operation unit 5-1-1 extracts the signal having the same waveform as that of the transmission signal (1) (the signal correlated with the transmission signal (1)) from among the reception signals of the receiving antenna element 3-1 by performing the cross-correlation process between the replica of the transmission signal (1) generated by the replica generation unit 4 and the reception signal of the receiving antenna element 3-1, and outputs the signal to the weight application unit 9-1-1 as the signal after the cross-correlation process (Step St4).

Herein, the replica of the transmission signal (1) is a signal stream having a predetermined length, and the cross-correlation process between the replica of the transmission signal (1) and the reception signal can be implemented by using, e.g., a matched filter that determines the correlation between the replica of the transmission signal (1) and the reception signal by multiplying the replica of the transmission signal (1) and the reception signal.

The cross-correlation operation unit 5-1-2 extracts the signal having the same waveform as that of the transmission signal (2) from among the reception signals of the receiving antenna element 3-1 by performing the cross-correlation process between the replica of the transmission signal (2) generated by the replica generation unit 4 and the reception signal of the receiving antenna element 3-1, and outputs the signal to the weight application unit 9-1-2 as the signal after the cross-correlation process (Step ST4).

The cross-correlation operation unit 5-1-3 extracts the signal having the same waveform as that of the transmission signal (3) from among the reception signals of the receiving antenna element 3-1 by performing the cross-correlation process between the replica of the transmission signal (3) generated by the replica generation unit 4 and the reception signal of the receiving antenna element 3-1, and outputs the signal to the weight application unit 9-1-3 as the signal after the cross-correlation process (Step ST4).

The same cross-correlation process as that performed in each of the cross-correlation operation units 5-1-1 to 5-1-3 of the correlation process unit 5-1 is performed in each of the cross-correlation operation units 5-2-1 to 5-2-3 of the correlation process unit 5-2, and the signals after the cross-correlation process are outputted to the weight application units 9-2-1 to 9-2-3 (Step ST4).

Note that the cross-correlation operation units 5-2-1 to 5-2-3 are different from the cross-correlation operation units 5-1-1 to 5-1-3 in that the cross-correlation process is performed on the reception signal of the receiving antenna element 3-2.

The same cross-correlation process as that performed in each of the cross-correlation operation units 5-1-1 to 5-1-3 of the correlation process unit 5-1 is performed in each of the cross-correlation operation units 5-N-1 to 5-N-3 of the correlation process unit 5-N, and the signals after the cross-correlation process are outputted to the weight application units 9-N-1 to 9-N-3 (Step ST4).

Note that the cross-correlation operation units 5-N-1 to 5-N-3 are different from the cross-correlation operation units 5-1-1 to 5-1-3 in that the cross-correlation process is performed on the reception signal of the receiving antenna element 3-N.

The correlation process units 5-1 to 5-N perform the cross-correlation process, whereby the antenna aperture of the receiving antenna elements 3-1 to 3-N is virtually enlarged.

As is clear from Expressions (3) to (5) described above, the length of the antenna aperture after the cross-correlation process by the correlation process units 5-1 to 5-N is represented by the following Expression (6) when the receiving antenna element 3-1 is used as the reference.

The length of the antenna aperture after the cross-correlation process:

$$(d_{TX1} + d_{TX2}) + \left(\sum_{p=1}^{N-1} d_{RXp}\right). \quad (6)$$

That is, the length of the antenna aperture after the cross-correlation process is equal to the sum of the interval ($d_{TX1}+d_{TX2}$) between the transmitting antenna 2-1 and the transmitting antenna 2-3 and the interval ($d_{RX1}+d_{RX2}+\ldots+d_{RX(N-1)}$) between the receiving antenna element 3-1 and the receiving antenna element 3-N.

Figure 4:
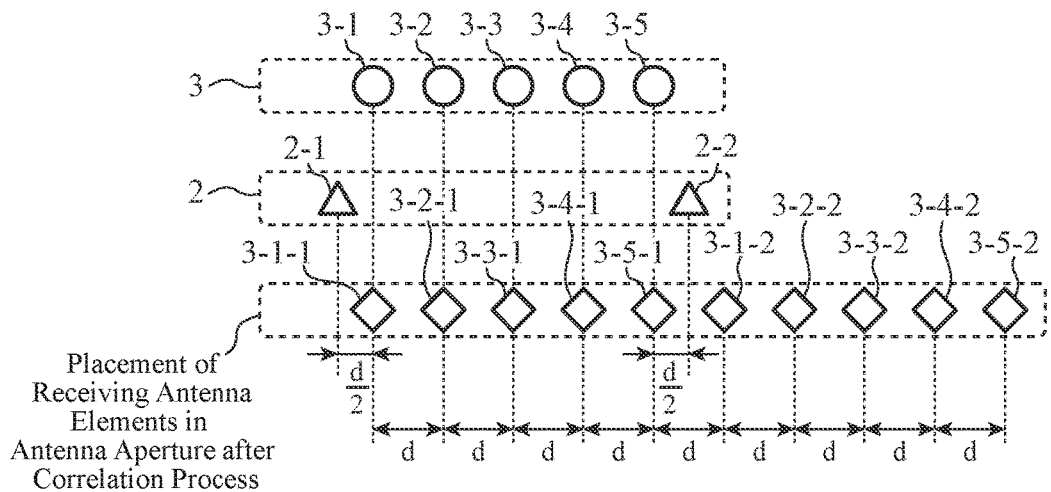
FIG. 4 is an explanatory view showing the arrangement of transmitting antennas and receiving antenna elements and an antenna aperture after a cross-correlation process.

FIG. 4 is an explanatory view showing the arrangement of the transmitting antennas and the receiving antenna elements and the antenna aperture after the cross-correlation process.

Note that, for simplification of the description, FIG. 4 shows the case where two transmitting antennas 2-1 and 2-2 and five receiving antenna elements 3-1 to 3-5 are provided.

In addition, FIG. 4 shows an example in which the interval $d_{TX1}$ between the transmitting antenna 2-1 and the transmitting antenna 2-2 satisfies $d_{TX1}=5d$, and the interval $d_{RXp}$ between the receiving antenna element 3-p and the receiving antenna element 3-(p+1) satisfies $d_{RXp}=d$ (p=1, 2, 3, 4). That is, the interval between the receiving antenna element 3-1 and the receiving antenna element 3-5 is 4d.

In addition, the interval between the transmitting antenna 2-1 and the receiving antenna element 3-1 is d/2, and the interval between the transmitting antenna 2-2 and the receiving antenna element 3-5 is d/2.

3-1-1 to 3-5-1 represent an element arrangement of the receiving antenna elements 3-1 to 3-5 on the basis of the correlation process between the replica of the transmission signal (1) emitted from the transmitting antenna 2-1 and the reception signals of the receiving antenna elements 3-1 to 3-5.

In addition, 3-1-2 to 3-5-2 represent the element arrangement of the receiving antenna elements 3-1 to 3-5 on the basis of the correlation process between the replica of the transmission signal (2) emitted from the transmitting antenna 2-2 and the reception signals of the receiving antenna elements 3-1 to 3-5.

Consequently, the aperture length of the array antenna 3 is 4d in the case where the cross-correlation process by the correlation process units 5-1 to 5-5 is not performed, but the aperture length of the array antenna 3 is increased to 9d in accordance with Expression (6) described above by performing the cross-correlation process by the correlation process units 5-1 to 5-5.

The weight determination unit 8 of the weighting unit 6 refers to the information indicative of the arrangement of the transmitting antennas 2-1 to 2-3 and the receiving antenna elements 3-1 to 3-N retained in the transmitting/receiving antenna information retention unit 7, specifies the interval ($d_{TX1}+d_{TX2}$) between the transmitting antenna 2-1 and the transmitting antenna 2-3 and the interval ($d_{RX2}+d_{RX2}+\ldots+d_{RX(N-1)}$) between the receiving antenna element 3-1 and the receiving antenna element 3-N, and obtains the length of the antenna aperture after the cross-correlation process by the correlation process units 5-1 to 5-N, i.e., the length of the virtually enlarged antenna aperture of the receiving antenna elements 3-1 to 3-N in accordance with Expression (6) described above (Step ST5).

Herein, the weight determination unit 8 obtains the length of the antenna aperture after the cross-correlation process by the correlation process units 5-1 to 5-N, but in the case where the length of the antenna aperture after the cross-correlation process is specified in advance and the length of the antenna aperture is retained in the transmitting/receiving antenna information retention unit 7, the weight determination unit 8 may read out the length of the antenna aperture retained in the transmitting/receiving antenna information retention unit 7.

When the weight determination unit 8 obtains the length of the antenna aperture of the receiving antenna elements 3-1 to 3-N, the weight determination unit 8 determines the weight by which the signals after the cross-correlation process outputted from the cross-correlation operation units 5-1-1 to 5-1-3, 5-2-1 to 5-2-3, ..., and 5-N-1 to 5-N-3 are multiplied in such a way that amplitude distribution corresponding to the length of the antenna aperture matches the antenna directivity pattern retained in the transmitting/receiving antenna information retention unit 7 (Step ST6).

Herein, shown is an example in which the antenna directivity pattern retained in the transmitting/receiving antenna information retention unit 7 is assumed to relate to the pattern of the amplitude distribution, and the weight is determined in such a way that the amplitude distribution corresponding to the length of the antenna aperture matches the antenna directivity pattern retained in the transmitting/receiving antenna information retention unit 7. However, in the case where the antenna directivity pattern retained in the transmitting/receiving antenna information retention unit 7 relates to phase distribution, the weight is determined in such a way that the phase distribution corresponding to the length of the antenna aperture matches the antenna directivity pattern retained in the transmitting/receiving antenna information retention unit 7.

In addition, in the case where the antenna directivity pattern retained in the transmitting/receiving antenna information retention unit 7 relates to both of the amplitude distribution and the phase distribution, the weight is determined in such a way that the amplitude distribution and the phase distribution corresponding to the length of the antenna aperture match the antenna directivity pattern retained in the transmitting/receiving antenna information retention unit 7.

In general, in order to obtain the desired directivity pattern, it is necessary to give an amplitude characteristic and a phase characteristic to the antenna aperture in accordance with a freely-selected function.

As the characteristics according to the freely-selected function, uniform distribution, cosine distribution, cosine squared distribution, Taylor distribution, and Chebyshev distribution are known.

Figure 5:
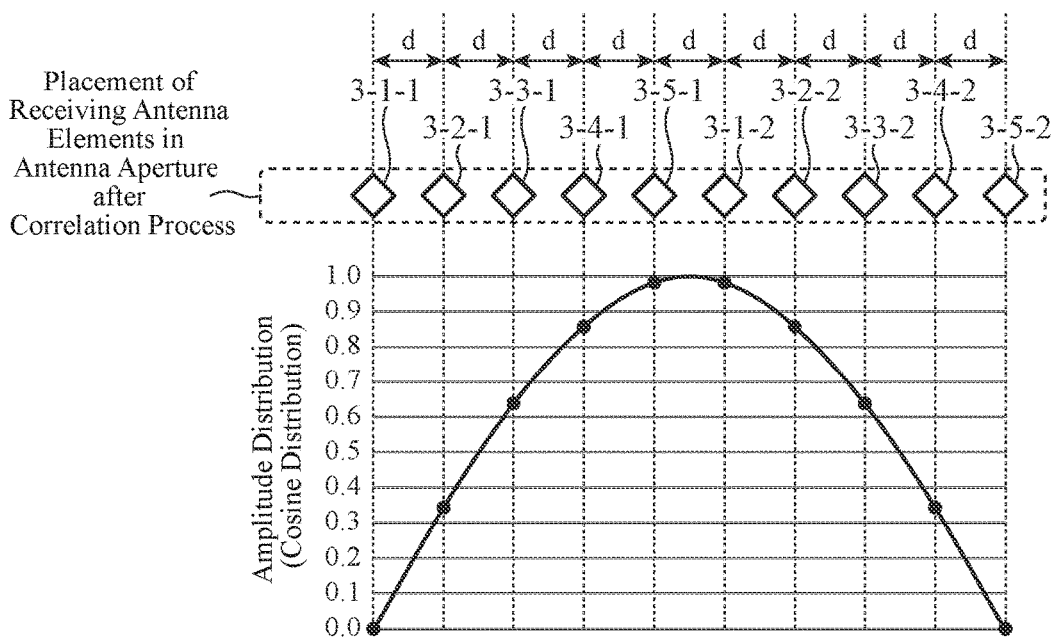
FIG. 5 is an explanatory view showing the amplitude distribution of a weight when a function applied to the antenna aperture after the cross-correlation process is cosine distribution.

FIG. 5 is an explanatory view showing the amplitude distribution of the weight when the freely-selected function applied to the antenna aperture after the cross-correlation process is the cosine distribution.

FIG. 5 shows the case where two transmitting antennas 2-4 and 2-2 and five receiving antenna elements 3-1 to 3-5 are placed as in FIG. 4, and the cosine distribution is applied to the virtual element arrangements 3-1-1 to 3-5-1 and 3-1-21 to 3-5-2 of the receiving antenna elements 3-1 to 3-5 in the antenna aperture after the cross-correlation process.

In an example in FIG. 5, the weight of the virtual element arrangements 3-1-1 and 3-5-2 of the receiving antenna elements 3-1 to 3-5 in the antenna aperture after the cross-correlation process is determined to be about 0.0, and the weight of the element arrangements 3-2-1 and 3-4-2 is determined to be about 0.34, and the weight of the element arrangements 3-3-1 and 3-3-2 is determined to be about 0.64, and the weight of the element arrangements 3-4-1 and 3-2-2 is determined to be about 0.87, and the weight of the element arrangements 3-5-1 and 3-1-2 is determined to be about 0.98. Note that the above weights are only exemplary.

When the weight determination unit 8 determines the weights, the weight application units 9-1-1 to 9-1-3, 9-2-1 to 9-2-3, ..., and 9-N-1 to 9-N-3 of the weighting unit 6 multiply the signals after the cross-correlation process outputted from the cross-correlation operation units 5-1-1 to 5-1-3, 5-2-1 to 5-2-3, ..., and 5-N-1 to 5-N-3 by the weights, and output the signals after the cross-correlation process multiplied by the weights to the signal combination unit 10 (Step ST7).

For example, when it is assumed that the signal after the cross-correlation process outputted from each cross-correlation operation unit is a complex signal $a_r e^{j\phi_r}$ (a complex signal having an amplitude $a_r$ and a phase $\phi_r$), the weight represented by a complex signal $a_w e^{j\phi_w}$ having an amplitude $a_w$ and a phase $\phi_w$ is determined by the weight determination unit 8, and hence a multiplication of $a_r e^{j\phi_r} \times a_w e^{j\phi_w}$ is performed in each weight application unit.

When the weight application units 9-1-1 to 9-1-3, 9-2-1 to 9-2-3, ..., and 9-N-1 to 9-N-3 multiply the signals after the cross-correlation process by the weights, the signal combination unit 10 combines the signals after the cross-correlation process multiplied by the weights, and outputs the combined signal (Step ST8).

Figure 6:
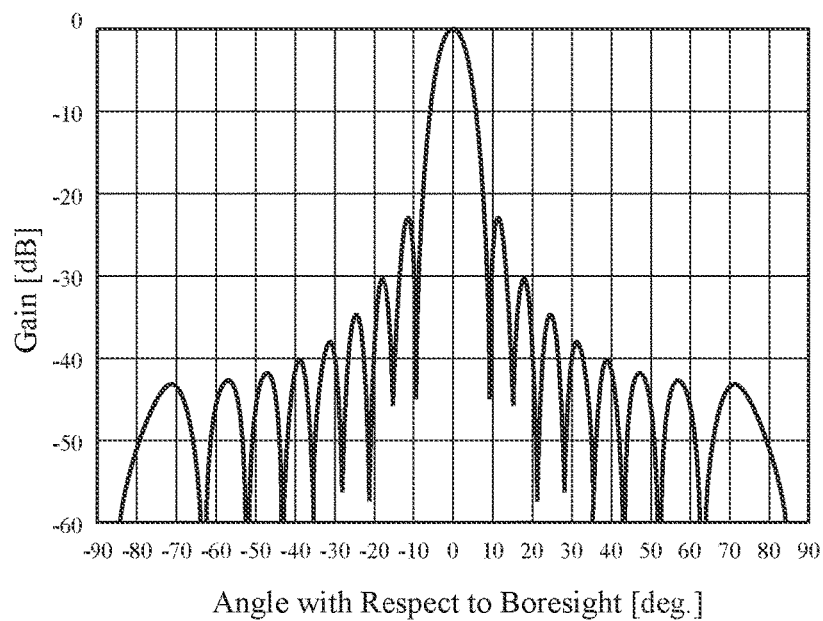
FIG. 6 is an explanatory view showing an example of a directivity pattern obtained by the sensor device according to Embodiment 1 of the invention.

FIG. 6 is an explanatory view showing an example of the directivity pattern obtained by the sensor device according to Embodiment 1 of the invention.

Note that FIG. 6 shows the case where the number of transmitting antennas is two, the number of receiving antenna elements is ten, the interval between the receiving antenna elements is a half wavelength, and the interval between the transmitting antennas is five wavelengths.

In addition, FIG. 6 shows the case where the transmitting antennas and the receiving antenna elements are placed linearly, and the interval between the transmitting antenna and the closest receiving antenna element is a wavelength/4, and the freely-selected function that provides the amplitude characteristic is the cosine distribution.

As is clear from the above description, according to Embodiment 1, there are provided the correlation process units 5-1 (5-2, ..., and 5-N) for performing the cross-correlation process between the replicas of the plurality of mutually orthogonal transmission signals (1) to (3) and the reception signals of the receiving antenna elements 3-1 (3-2, ..., and 3-N) and outputting the plurality of signals after the cross-correlation process, and the weighting unit 6 for weighting the plurality of signals after the cross-correlation process outputted from the correlation process units 5-1 to 5-N in accordance with the arrangement of the transmitting antennas 2-1 to 2-3 and the receiving antenna elements 3-1 to 3-N and the antenna directivity pattern, and the signal combination unit 10 combines the plurality of signals after the cross-correlation process that are weighted by the weighting unit 6, and hence the effect is achieved that it is possible to virtually increase the aperture length of the array antenna 3 constituted by the receiving antenna elements 3-1 to 3-N.

With this, it becomes possible to increase the directivity of the antenna and obtain the desired directivity pattern.

Embodiment 1 describes an example in which the transmitting antennas 2-1 to 2-3 and the receiving antenna elements 3-1 to 3-N are placed one-dimensionally, but a plurality of transmitting antennas and a plurality of receiving antenna elements may also be placed two-dimensionally.

Embodiment 1 describes an example in which one directivity pattern is obtained, but a plurality of different directivity patterns may also be obtained. In this case, the weight application units 9-1-1 to 9-1-3, 9-2-1 to 9-2-3, and 9-N-1 to 9-N-3 and the signal combination unit 10 may be provided for each directivity pattern appropriately.

Embodiment 2

In Embodiment 1 described above, FIG. 4 shows an example in the case where two transmitting antennas 2-1 and 2-2 and five receiving antenna elements 3-1 to 3-5 are provided.

In the example in FIG. 4, the receiving antenna elements 3-1 to 3-5 do not include the receiving antenna element placed at a position that overlaps the positions of the transmitting antennas 2-1 and 2-2, but the receiving antenna elements 3-1 to 3-5 may include the receiving antenna element placed at the position that overlap the positions of the transmitting antennas 2-1 and 2-2.

In Embodiment 2, the configuration of the sensor device is the same as that in FIG. 1 in Embodiment 1 described above.

Figure 7:
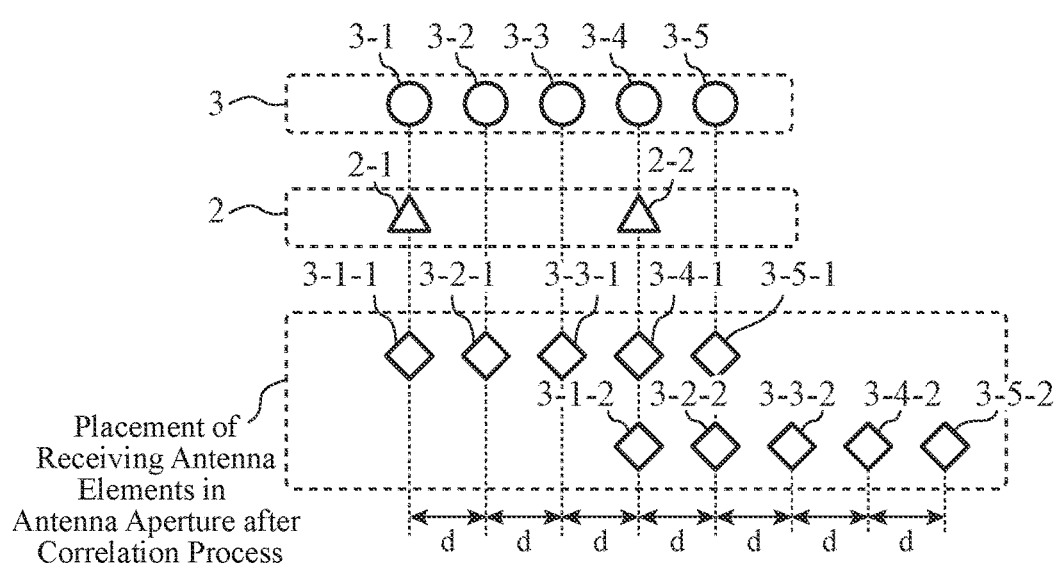
FIG. 7 is an explanatory view showing the arrangement of the transmitting antennas and the receiving antenna elements and the antenna aperture after the cross-correlation process.

FIG. 7 is an explanatory view showing the arrangement of the transmitting antennas and the receiving antenna elements and the antenna aperture after the cross-correlation process.

For simplification of the description, FIG. 7 shows the case where two transmitting antennas 2-1 and 2-2 and five receiving antenna elements 3-1 to 3-5 are provided.

In addition, FIG. 7 shows an example in which the interval $d_{TX1}$ between the transmitting antenna 2-1 and the transmitting antenna 2-2 satisfies $d_{TX1}$=3d, and the interval $d_{RXp}$ between the receiving antenna element 3-$p$ and the receiving antenna element 3-($p$+1) satisfies $d_{RXp}$=d ($p$=1, 2, 3, 4). That is, the interval between the receiving antenna element 3-1 and the receiving antenna element 3-5 is 4d.

In addition, the position of the transmitting antenna 2-1 matches the position of the receiving antenna element 3-1 in an array direction, and the position of the transmitting antenna 2-2 matches the position of the receiving antenna element 3-3 in the array direction.

3-1-1 to 3-5-1 represent the element arrangement of the receiving antenna elements 3-1 to 3-5 based on the correlation process between the replica of the transmission signal (1) emitted from the transmitting antenna 2-1 and the reception signals of the receiving antenna elements 3-1 to 3-5.

In addition, 3-1-2 to 3-5-2 represent the element arrangement of the receiving antenna elements 3-1 to 3-5 based on the correlation process between the replica of the transmission signal (2) emitted from the transmitting antenna 2-2 and the reception signals of the receiving antenna elements 3-1 to 3-5.

Consequently, the aperture length of the array antenna 3 is 4d in the case where the cross-correlation process by the correlation process units 5-1 to 5-N is not performed, but the aperture length of the array antenna 3 is increased to 7d in accordance with Expression (6) described above by performing the cross-correlation process by the correlation process units 5-1 to 5-N.

Note that, in Embodiment 2, the position of the transmitting antenna 2-1 matches the position of the receiving antenna element 3-1 in the array direction, and the position of the transmitting antenna 2-2 matches the position of the receiving antenna element 3-3 in the array direction. Accordingly, the element arrangement 3-4-1 overlaps the element arrangement 3-1-2, and the element arrangement 3-5-1 overlaps the element arrangement 3-2-2.

Figure 8:
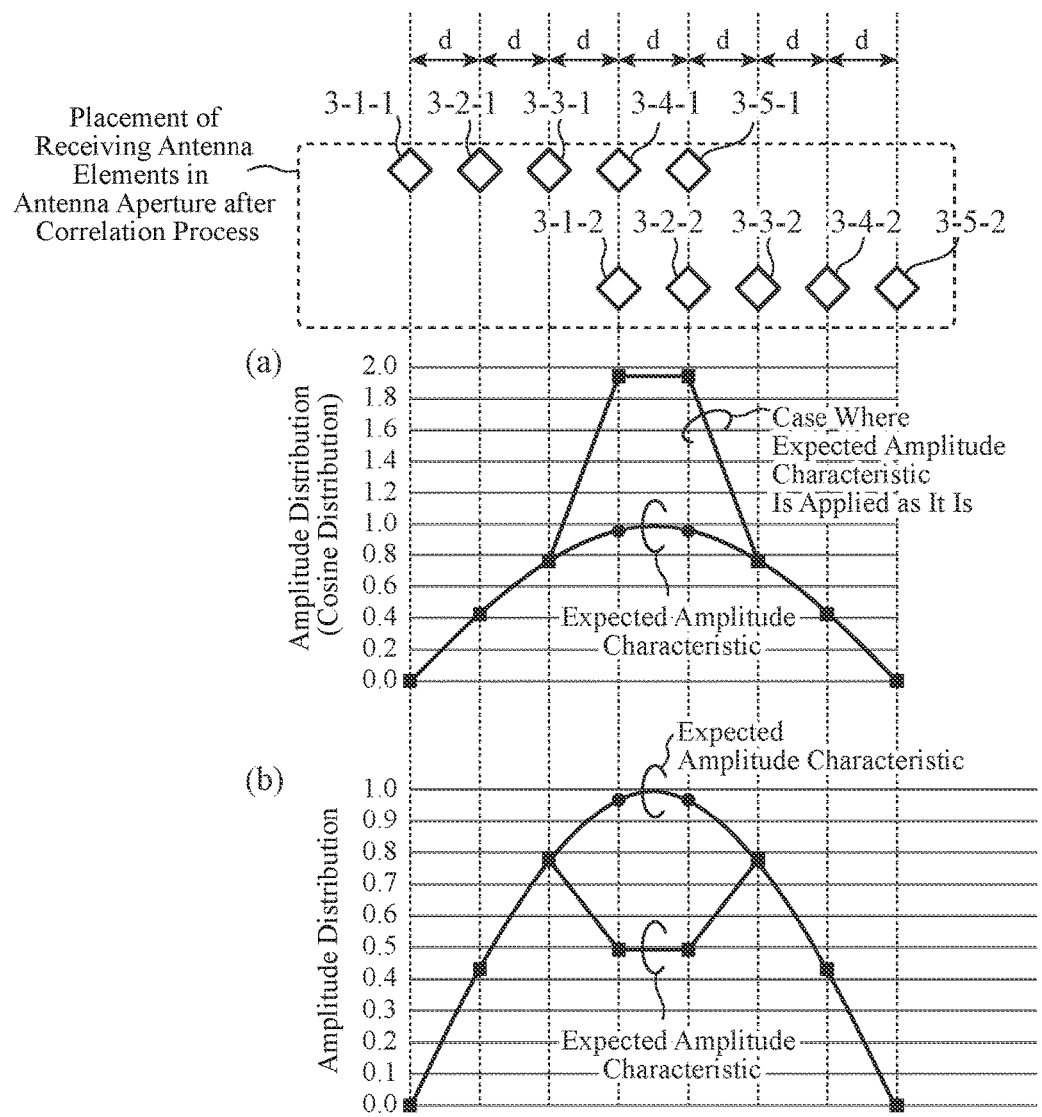
FIG. 8 is an explanatory view showing the amplitude distribution of the weight when a function applied to the antenna aperture after the cross-correlation process is the cosine distribution.

FIG. 8 is an explanatory view showing the amplitude distribution of the weight when the freely-selected function applied to the antenna aperture after the cross-correlation process is the cosine distribution.

Similarly to Embodiment 1 described above, the weight determination unit 8 of the weighting unit 6 obtains the length of the antenna aperture after the cross-correlation process, and determines the weight by which the signal after the cross-correlation process is multiplied in such a way that the amplitude distribution corresponding to the length of the antenna aperture matches the antenna directivity pattern retained in the transmitting/receiving antenna information retention unit 7.

Note that, as shown in FIG. 7, in the case where the element arrangements 3-4-1 and 3-5-1 overlap the element arrangements 3-1-2 and 3-2-2, when the weight is determined in the same manner as in Embodiment 1 described above, as shown in FIG. 8A, two signals after the cross-correlation process are present in the element arrangements that overlap each other, and hence the amplitude of an input signal to the signal combination unit 10 at a position where the element arrangements overlap each other becomes twice as high as the desired amplitude.

To cope with this, in Embodiment 2, in the case where the element arrangements 3-4-1 and 3-5-1 overlap the element arrangements 3-1-2 and 3-2-2, when it is assumed that the cross-correlation operation units and the weight application units corresponding to the element arrangements 3-4-1, 3-5-1, 3-1-2, and 3-2-2 are the cross-correlation operation units 5-4-1, 5-5-1, 5-1-2, and 5-5-2 and the weight application units 9-4-1, 9-5-1, 9-1-2, and 9-2-2, the weight determination unit 8 of the weighting unit 6 determines the weights by which the signals outputted from the cross-correlation operation units 5-1-1 to 5-3-1 and 5-3-2 to 5-5-2 are multiplied in the same manner as in Embodiment 1 described above.

On the other hand, as for the weights by which the signals outputted from the cross-correlation operation units 5-4-1, 5-5-1, 5-1-2, and 5-2-2, the weight determination unit 8 determines weights equal to one-half of the weights determined in the same manner as in Embodiment 1 described above.

When the weight determination unit 8 determines the weights, the weight application units 9-1-1 to 9-5-1 and 9-1-2 to 9-5-2 of the weighting unit 6 multiply the signals after the cross-correlation process outputted from the cross-correlation operation units 5-1-1 to 5-5-1 and 5-1-2 to 5-5-2 by the weights, and output the signals after the cross-correlation process multiplied by the weights to the signal combination unit 10.

When the weight application units 9-1-1 to 9-5-1 and 9-1-2 to 9-5-2 multiply the signals after the cross-correlation process by the weights, the signal combination unit 10 combines the signals after the cross-correlation process multiplied by the weights, and outputs the combined signal.

At this point, the weights by which the signals outputted from the cross-correlation operation units 5-4-1, 5-5-1, 5-1-2, and 5-2-2 are multiplied are determined to be equal to one half, and hence, in the element arrangement 3-4-1 and the element arrangement 3-1-2 that overlap each other, the signals after the cross-correlation process outputted from the weight application units 9-4-1 and 9-1-2 correspond to one-half of those in Embodiment 1 described above.

In addition, in the element arrangement 3-5-1 and the element arrangement 3-2-2 that overlap each other, the signals after the cross-correlation process outputted from the weight application units 9-5-1 and 9-2-2 correspond to one-half of those in Embodiment 1 described above.

With this, as shown in FIG. 8E, even in the element arrangements that overlap each other, the amplitude distribution matches the desired antenna directivity pattern retained in the transmitting/receiving antenna information retention unit 7.

Embodiment 2 has described the embodiment in which the weight at the position where the element arrangements overlap each other is determined to be equal to one-half of the weight determined in the same manner as in Embodiment 1 described above. However, for example, the weight at the position where the element arrangements overlap each other may be determined in the same manner as in Embodiment 1 described above, the weight at the position where the element arrangements do not overlap each other may be determined to be twice the weight determined in the same manner as in Embodiment 1 described above, and then the amplitude of each element arrangement may be adjusted in such a way that the overall gain becomes 1.

Note that, in Embodiment 2, the number of positions where the element arrangements overlap each other is two, and hence the weight is determined to be equal to one-half of the weight. However, when the number of positions where the element arrangements overlap each other is M, the weight may be determined to be one M-th of the weight.

As is clear from the above description, according to Embodiment 2, even in the case where the receiving antenna elements 3-1 to 3-5 include the receiving antenna element placed at the position that overlaps the positions of the transmitting antennas 2-1 and 2-2, similarly to Embodiment 1 described above, the effect is achieved that it is possible to virtually increase the aperture length of the array antenna 3 constituted by the receiving antenna elements 3-1 to 3-5.

With this, it becomes possible to increase the directivity of the antenna and obtain the desired directivity pattern.

Embodiment 3

Figure 9:
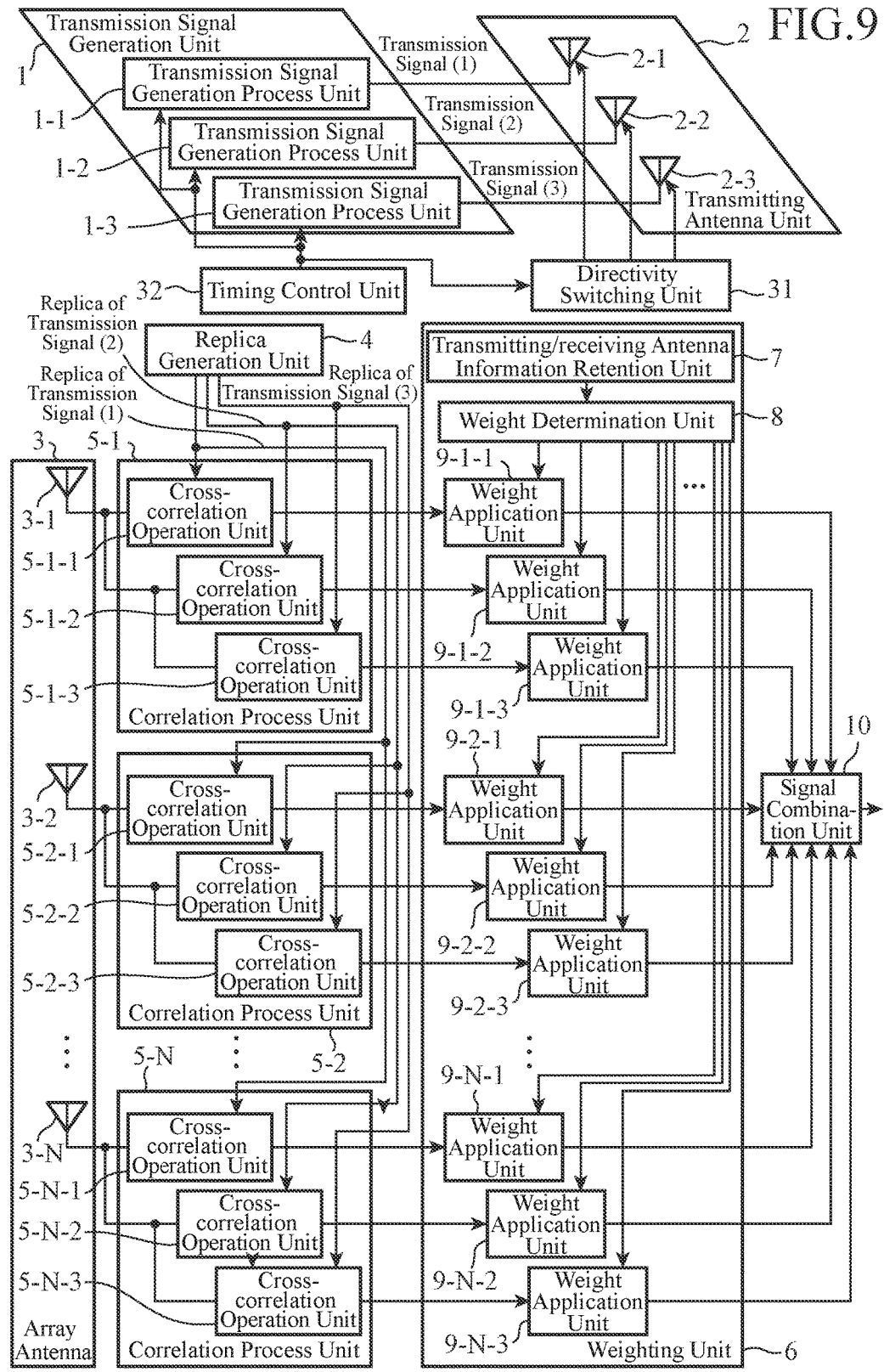
FIG. 9 is a configuration diagram showing the sensor device according to Embodiment 3 of the invention.

FIG. 9 is a configuration diagram showing the sensor device according to Embodiment 3 of the invention and, in FIG. 9, the same reference numerals as those in FIG. 1 denote the same or corresponding portions, and hence the description thereof will be omitted.

A directivity switching unit 31 is a device that switches the directivity of the transmitting antenna 2-1 to 2-3 under control by a timing control unit 32.

Note that the directivity switching unit 31 may be constituted by a drive unit that physically switches the orientations of the transmitting antennas 2-1 to 2-3 such as a motor or may also be constituted by an optical element that optically switches the directions of the transmission signals (1) to (3) emitted from the transmitting antennas 2-1 to 2-3, and the directivity switching unit 31 may perform electrical switching in the case where the transmitting antennas 2-1 to 2-3 are constituted by a plurality of elements, and the transmitting antenna unit 2 uses the transmitting antennas 2-1 to 2-3 as sub-arrays.

The timing control unit 32 is a control circuit that controls the switching timing of the directivity by the directivity switching unit 31.

Next, operations will be described. Embodiment 3 is the same as Embodiments 1 and 2 except that the directivity switching unit 31 and the timing control unit 32 are provided, and hence only the operations of the directivity switching unit 31 and the timing control unit 32 will be described.

Each of Embodiments 1 and 2 describes the embodiment in which the transmitting antennas 2-1 to 2-3 emit the mutually orthogonal transmission signals (1) to (3) to space and, for example, in the case where a satellite or the like on which the sensor device in FIG. 1 is mounted is moving or the case where the observation target is moving, the Doppler shift resulting from the movement occurs. As a result, there are cases where the orthogonality of the reception signals of the receiving antenna elements 3-1 to 3-N is slightly spoiled due to an influence of, for example, a difference in the path from each of the transmitting antennas 2-1 to 2-3 to the observation target.

In Embodiment 3, in order to maintain the orthogonality of the reception signals of the receiving antenna elements 3-1 to 3-N, the directivity switching unit 31 and the timing control unit 32 are provided.

The timing control unit 32 controls the switching timing of the directivity by the directivity switching unit 31.

That is, at the timing of switching the directivities of the transmitting antennas 2-1 to 2-3, the timing control unit 32 outputs directivity switching commands to the directivity switching unit 31 and the transmission signal generation process units 1-1 to 1-3.

When the directivity switching unit 31 receives the directivity switching command from the timing control unit 32, the directivity switching unit 31 performs an operation of switching the directivities of the transmitting antennas 2-1 to 2-3.

Similarly to Embodiments 1 and 2 described above, the transmission signal generation process units 1-1 to 1-3 generate the mutually orthogonal transmission signals (1) to (3), and output the transmission signals (1) to (3) to the transmitting antennas 2-1 to 2-3. However, at timing at which the directivities of the transmitting antennas 2-1 to 2-3 are switched by the directivity switching unit 31, in order to prevent the outputting of the transmission signals (1) to (3) to the transmitting antennas 2-1 to 2-3, when the transmission signal generation process units 1-1 to 1-3 receive the directivity switching commands from the timing control unit 32, the transmission signal generation process units suspend the outputting of the transmission signals (1) to (3) to the transmitting antennas 2-1 to 2-3 during a predetermined time period.

Figure 10:
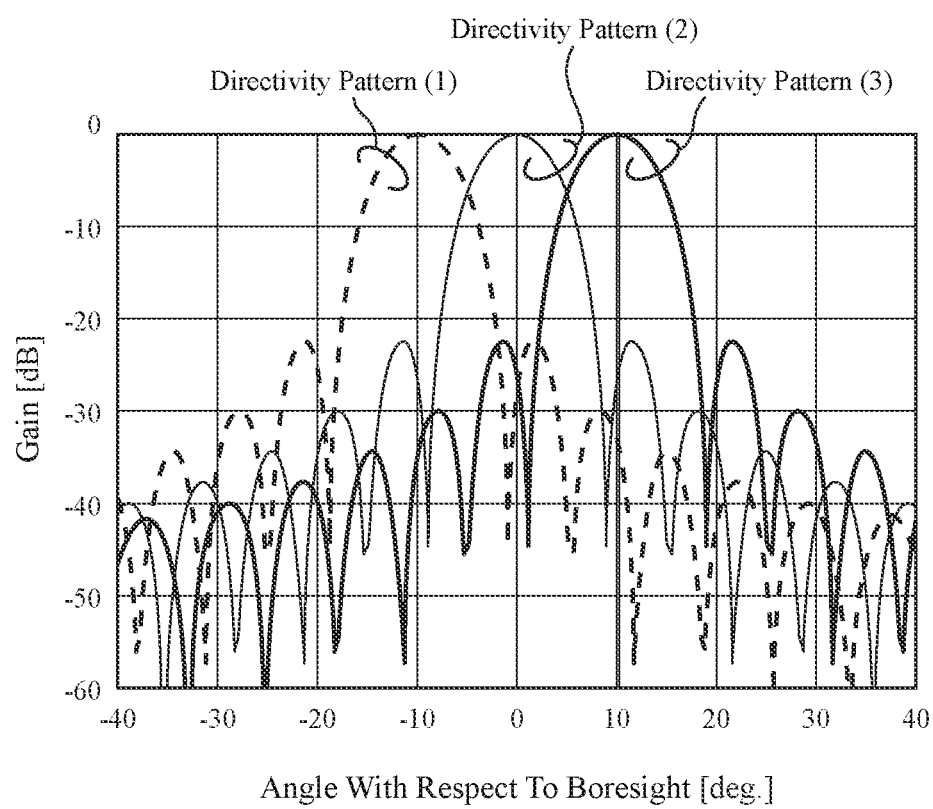
FIG. 10 is an explanatory view showing examples of the directivity patterns of transmitting antennas 2-1 to 2-3.

Herein, FIG. 10 is an explanatory view showing examples of the directivity patterns of the transmitting antennas 2-1 to 2-3.

As shown in FIG. 10, Embodiment 3 describes an example in which three directivity patterns (1) to (3) are prepared, and allocation of the directivity patterns (1) to (3) to the transmitting antennas 2-1 to 2-3 is sequentially switched.

It is assumed that the directivity patterns (1) to (3) are directivity patterns of which main lobes each having the highest gain do not overlap each other.

Hereinbelow, examples of switching the directivity patterns (1) to (3) by the directivity switching unit 31 will be specifically described.

Note that it is assumed that Embodiment 3 is applied to the case where the observation target is present only in one of directions indicated by the directivity patterns (1) to (3).

When the directivity switching unit 31 receives the first switching command outputted from the timing control unit 32, the directivity switching unit 31 allocates the directivity patterns (1) to (3) to the transmitting antennas 2-1 to 2-3 in the following manner.

directivity pattern (1)→transmitting antenna 2-1
directivity pattern (2)→transmitting antenna 2-2
directivity pattern (3)→transmitting antenna 2-3 when the directivity switching unit 31 receives the next switching command outputted from the timing control unit 32, the directivity switching unit 31 allocates the directivity patterns (1) to (3) to the transmitting antennas 2-1 to 2-3 in the following manner.

directivity pattern (2)→transmitting antenna 2-1
directivity pattern (3)→transmitting antenna 2-2
directivity pattern (1)→transmitting antenna 2-3

When the directivity switching unit 31 receives the next switching command outputted from the timing control unit 32, the directivity switching snit 31 allocates the directivity patterns (1) to (3) to the transmitting antennas 2-1 to 2-3 in the following manner.

directivity pattern (3)→transmitting antenna 2-1
directivity pattern (1)→transmitting antenna 2-2
directivity pattern (2)→transmitting antenna 2-3

With this, even when the three transmission signals (1) to (3) are emitted from the transmitting antennas 2-1 to 2-3 simultaneously, as long as the observation target is present only in the direction indicated by, e.g., the directivity pattern (1), the reflected waves of the transmission signals emitted in the directions indicated by the directivity patterns (2) and (3) are not received by the receiving antenna elements 3-1 to 3-N.

As a result, even when the Doppler shift resulting from the movement of the satellite or the like on which the sensor device in FIG. 1 is mounted or the movement of the observation target occurs, it is possible to maintain the orthogonality of the reception signals of the receiving antenna elements 3-1 to 3-N.

As is clear from the above description, according to Embodiment 3, the directivity switching unit 31 switches the directivities of the transmitting antennas 2-1 to 2-3 by the control by the timing control unit 32, and hence, for example, even in the case where the satellite or the like on which the sensor device is mounted is moving or the case where the observation target is moving, it is possible to maintain the orthogonality of the reception signals of the receiving antenna elements 3-1 to 3-N. As a result, it becomes possible to obtain the desired directivity pattern with high accuracy.

Note that it is possible to freely combine the embodiments, modify any components of the embodiments, or omit any components in the embodiments within the scope of the invention.

INDUSTRIAL APPLICABILITY

The sensor device according to the invention is suitable as the sensor device that needs to virtually increase the aperture length of the array antenna constituted by a plurality of receiving antenna elements to thereby increase the directivity of the antenna.

REFERENCE SIGNS LIST

1 transmission signal generation unit
1-1 to 1-3 transmission signal generation process unit
2 transmitting antenna unit
2-1 to 2-3 transmitting antenna
3 array antenna
3-1 to 3-N receiving antenna element
3-1-1 to 3-5-1, 3-1-2 to 3-5-2 element arrangement of receiving antenna elements based on correlation process
4 replica generation unit
5-1 to 5-N correlation process unit
5-1-1 to 5-1-3, 5-2-1 to 5-2-3, 5-N-1 to 5-N-3 cross-correlation operation unit
6 weighting unit
7 transmitting/receiving antenna information retention unit
8 weight determination unit
9-1-1 to 9-1-3, 9-2-1 to 9-2-3, 9-N-1 to 9-N-3 weight application unit
10 signal combination unit
21 memory
22 processor
31 directivity switching unit
32 timing control unit

The invention claimed is:

1. A sensor device comprising:
   a transmission signal generator to generate a plurality of mutually orthogonal transmission signals;
   a transmitting antenna unit to emit the transmission signals generated by the transmission signal generator from a plurality of transmitting antennas to space;
   an array antenna constituted by one or more receiving antenna elements to receive reflected waves of the transmission signals that are reflected by an observation target after being emitted from the plurality of transmitting antennas;
   a plurality of correlation processors to perform a cross-correlation process between the plurality of transmission signals and reception signals of the receiving antenna elements and outputting a plurality of signals after the cross-correlation process;
   a weighting unit to weight the plurality of signals after the cross-correlation process outputted from the plurality of correlation processors in accordance with a placement of the transmitting antennas and the receiving antenna elements and a plurality of antenna directivity patterns, each of the plurality of antenna directivity patterns being allocated to the plurality of transmitting antennas in a predetermined pattern; and
   a signal combiner to combine the plurality of signals after the cross-correlation process that are weighted by the weighting unit.

2. The sensor device according to claim 1, further comprising:
   a replica generator to generate replicas of the plurality of transmission signals generated by the transmission signal generator,
   wherein the plurality of correlation processors perform a cross-correlation process between the replicas of the plurality of transmission signals generated by the replica generator and the reception signals of the receiving antenna elements and output the plurality of signals after the cross-correlation process.

3. The sensor device according to claim 1, wherein the weighting unit obtains a length of an antenna aperture after the cross-correlation process by the plurality of correlation processors from the placement of the transmitting antennas and the receiving antenna elements, determines a weight value by which the plurality of signals after the cross-correlation process outputted from the plurality of correlation processors are multiplied in accordance with the length of the antenna aperture and the antenna directivity pattern, and multiplies, by the weight value, the plurality of signals after the cross-correlation process outputted from the plurality of correlation processors.

4. The sensor device according to claim 3, wherein in a case where there exists a receiving antenna element whose position in an array direction matches a position of any one of the plurality of transmitting antennas, among the one or more receiving antenna elements, so that the plurality of signals after the cross-correlation process outputted from the plurality of correlation processors include a signal after the cross-correlation process whose position in the antenna aperture after the cross-correlation process is overlapped with that of another signal after the cross-correlation process, the weighting unit sets a weight value by which the signals after the cross-correlation process, whose positions being overlapped with each other, are multiplied, to a value less than a weight value determined in a case where the position of the signal in the antenna aperture after the cross-correlation process is not overlapped with that of another signal after the cross-correlation process.

5. The sensor device according to claim 1, further comprising:
   a directivity switcher to switch directivities of the plurality of transmitting antennas; and
   a timing controller to control switching timing of the directivities by the directivity switching unit.

* * * * *